Patented Jan. 1, 1935

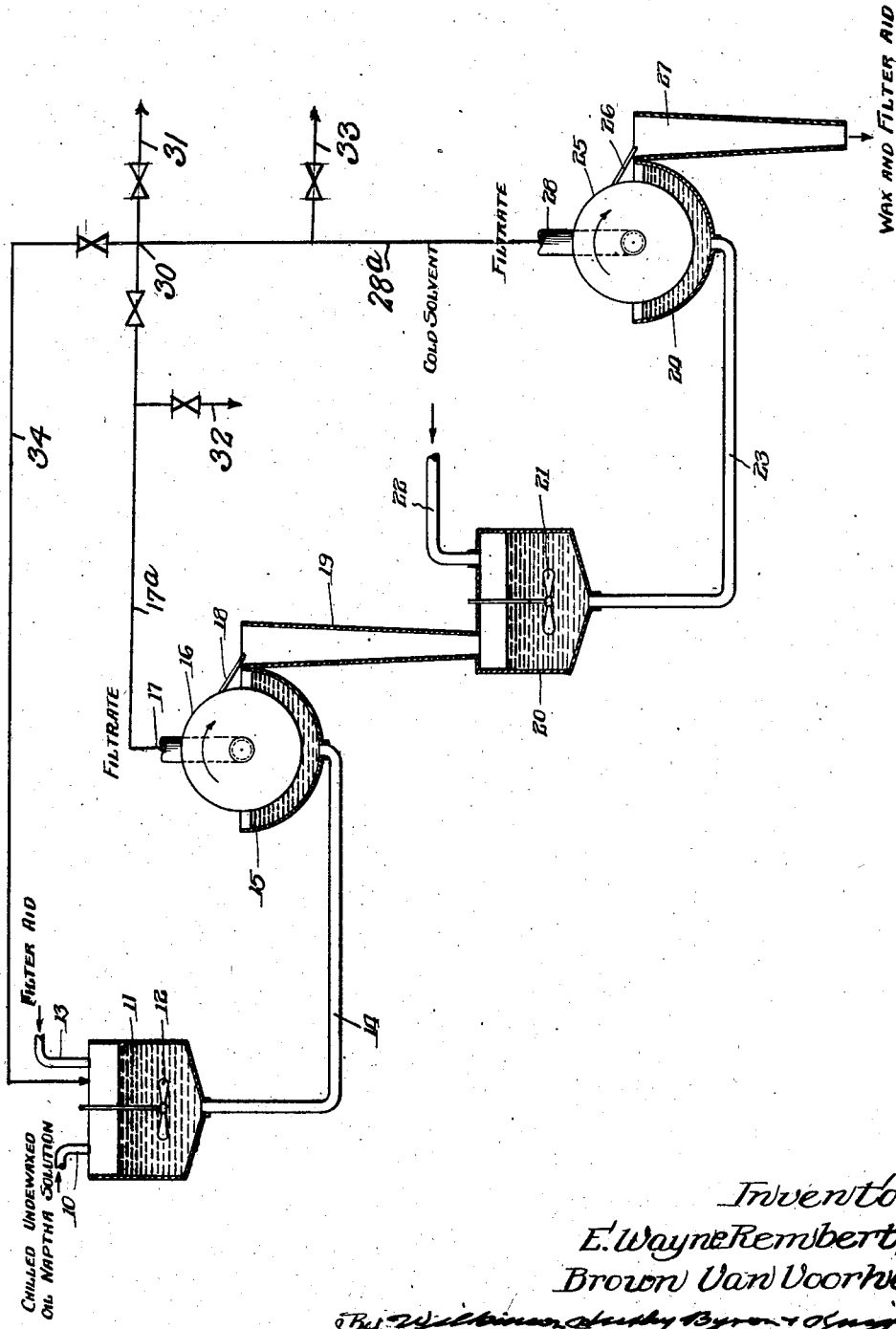

1,986,762

UNITED STATES PATENT OFFICE 1,986,762

DEWAXING BY FILTRATION

Ernest Wayne Rembert, Plainfield, N. J., and Brown Van Voorhees, New York, N. Y., assignors of three-fourths to Tide Water Oil Company, Bayonne, N. J., a corporation of New Jersey Application November 9, 1931, Serial No. 573,820

6 Claims. (Cl. 196—19)

This invention relates to improvements in the process of removing wax from petroleum oils and the like by filtration using a filter aid. It is particularly adapted to the dewaxing of mineral oils containing large amounts of wax and is primarily designed to reduce the amount of oil lost in the wax so removed. In the operation of processes involving filtration, continuous vacuum filters may be used to particular advantage but the invention is not limited to the use of such filters and discontinuous pressure filters may be used when desired.

The ordinary method of dewaxing oils by filtration consists in mixing the oil with a suitable solvent, which may be a naphtha, butyl alcohol, mixtures of these or any suitable organic solvent or mixtures of solvents, chilling this solution at a rate controlled by the type of wax contained in the oil and adding a filter aid if necessary, which may or may not be recovered from a subsequent step in the process, to the chilled solution under agitation to form a homogeneous slurry. In order to explain satisfactorily the conditions obtaining, the method will be described when using continuous vacuum filters. Such a chilled solution to which the filter aid has been added is passed into a continuous vacuum filter in which the filtering medium or cloth is mounted on a rotating drum. Vacuum is applied during certain parts of the cycle to the internal surface of the filtering cloth. The drum rotates in a pan containing the slurry to be filtered and filled to such a depth that during a portion of each revolution the filter cloth dips into the slurry and, due to the vacuum on the inside surface of the cloth, a cake is formed and the filtrate is drawn through and discharged. As the drum rotates, the filter cake leaves the slurry and the oil solution contained in the cake is drained through by the vacuum in the drum. This portion of the cycle is known as the drying cycle. As soon as the surface of the cake has been sufficiently drained of solution, a wash, using the same solvent as originally used for dilution, is sprayed on the cake, and during subsequent rotation of the drum, this wash is pulled through the cake. The filter cake is then removed prior to that portion of the cycle when the drum dips again in the slurry and the wax is later separated from the filter aid in another filtration operation.

Since the oil has a value several times greater than that of the wax, it is highly desirable to leave as little oil as possible in the filter cake. Several methods of reducing this amount of oil are possible; thus, the filter may be run at a very slow speed, insuring ample drainage time during the drying cycle but in this method an excessively large filter area is required. This is due to the use of a constant vacuum, since in such a case, the rate of fiiltration is initially very high and then rapidly drops off to a low rate which remains substantially constant. By increasing the filtering cycle time, the advantage of maintaining this high initial filtering rate through a large portion of the filtering cycle is lost, with the result that the average filter rate per unit area is materially reduced. This low rate which is due to the thickness of the cake formed, the viscosity of the solution being filtered and the extent to which the filter cake has been compressed continues through the drying cycle and controls the rate at which the cake can be drained. It can be seen that during the drying cycle the drainage rate will increase as the cake frees itself of filtrate, but since the filter rate falls off much faster at the beginning of the filtering cycle than the drainage rate increases during the drying cycle, it is evident that for a short filtration period, the allowable drying time in most cases will be inadequate to free the filter cake of filtrate. However, even if the drying time is sufficient to drain the interstices of the cake of filtrate, there will remain a considerable amount of oil-naphtha solution wetting the cake and the usual method of removing this oil is by spraying the cake with a solvent. This wash will pass through the cake at a high rate after the cake has been completely drained of the viscous filtrate, but in so doing the total filtering cycle time is further increased and the filter rate per unit area reduced still further. If the wash is sprayed on the cake while the cake contains filtrate, no increase in rate will occur since the viscous solution in the pores of the cake blocks the wash liquor. Although the amount of oil lost with the wax is materially reduced using a wash over that lost using natural drainage, the filtering capacity of a given area is reduced substantially, frequently below an economic limit. Another method of reducing the amount of oil lost in the wax is to use high solvent dilutions but this involves added costs of refrigeration, subsequent distillation, handling, etc.

To obtain the highest filter rate, large concentrations of filter aid are required but if the concentration of the filter aid is increased, the amount of cake formed is greater and consequently the amount of oil remaining in the cake is greater.

It is an object of the present invention to disclose a more economical process whereby continuous filtration equipment may be adapted to operation such that the yield of relatively cheap wax is reduced while the yield of the valuable oil is increased, and whereby for a reasonable wax yield, the total filter area required for a given production is reduced.

In this improved process, the amount of oil which may be contained in the wax is reduced materially by filtering the oil from the filter cake in a subsequent filtering step, after reslurrying in a cold solvent.

In the drawing the single figure is a diagrammatic sketch of the improved process.

According to our process the chilled undewaxed oil-naphtha solution carrying the precipitated wax in suspension enters at 10 into tank 11 which it is admixed by an agitator 12 with a filter aid introduced at 13. The filter aid may have been recovered from a later stage in the process. The slurry flows through the line 14 to the vacuum filter bowl 15. The rotating drum 16 carrying a filter cloth is under vacuum applied through pipe 17 and the filtrate is removed through the pipe 17. The cold filter cake which is formed is removed by discharge blade 18 and drops through a hopper 19 into a tank 20, where it is reslurried by an agitator 21 with a cold solvent introduced at 22. This cold mixture flows, without further chilling, through pipe 23 to a second filter bowl 24 where the filter cake is formed on the rotating filter drum 25 and removed by discharge blade 26 to drop through hopper 27. The filtrate from the second filter stage is removed by vacuum through pipe 28. The filter cake discharged from the second stage may go to the usual hot filter operation for separation of the filter aid from the wax.

The oil filtrates from the two filtering stages are preferably blended. The drawing shows schematically that continuations 17ª, 28ª of the pipes 17 and 28 join at 30, and that from this point a blend can be taken off through a valved pipe 31. The filtrates can be delivered separately through valved lines 32 and 33. Through a valved line 34 filtrate from the second stage can be recycled to the tank 11. By suitable adjustment of the valves diagrammatically shown, a part of the second filtrate can be recycled while another part is either blended with the first filtrate or drawn off separately.

In the drawing, drum type vacuum filters are shown but it is to be understood that any type filters may be used, both those using vacuum or those using pressure or combinations of these types of filters. Thus, if desirable, a pressure filter may be used to recover the oil remaining in the cake obtained on a vacuum filter, or the first filtration may take place in a pressure filter. In the latter case, the advantage derived from reslurrying results from the elimination of a time consuming washing operation on the first pressure filter.

In some cases, particularly when the price differential between the oil and the wax is larger, it may be desirable to reduce the wax yield still further, or in other words to reduce still further the amount of oil remaining in the wax. This may be accomplished according to this invention in a relatively simple manner. In the second filtration step, the amount of oil in the solution forming the slurry is relatively small with the result that at the filtering temperatures the viscosity of the solution is not high. Consequently the cake drains much more easily for a given cake thickness which makes possible the use of a wash during the drying cycle without increasing the filtration time to such an extent that the filter rate per unit area is materially reduced. It also may be desirable to use a pressure filter for this step since, due to the pressure difference across the cake, the latter is much compressed and oil which would be held in the pores of a cake on a vacuum filter is forced out leaving a comparatively dry filter cake. In normal dewaxing the use of a pressure filter results in a filter rate per unit area much lower than that obtained under similar conditions with a vacuum filter because of the compression of the filter cake and the difficulty of forcing the viscous solution through the constricted interstices. However, in the second filtration stage the lower viscosity of the solution decreases this difference and with certain types of oil and wax makes the use of a pressure type filter highly desirable.

The following is a specific example of our process. Residual filtered cylinder stock from Pennsylvania crude oil having a viscosity of 140 to 150 seconds at 210 degrees is dewaxed with the use of a filter aid in naphtha dilution on a continuous vacuum type filter. Under operating conditions which will give a pour test on the finished stock of 25° F., the wax and oil which are removed in the filter cake and subsequently recovered as wax amount to 25% of the undiluted undewaxed oil. When this cake has been discharged from the filter stage and slurried with a suitable amount of cold naphtha, a second vacuum filtration will remove the oil which is held in the first cake and reduce the wax yield to 11.5%. By maintaining a suitable temperature in the second filtration, it is possible to remove only the oil in the filtrate, thus making a low cold test on this oil also and rendering it suitable for blending with the low pour test filtrate from the first filter stage. Using this process in which the cake is reslurried and the oil recovered on a second filter, it is possible to take advantage of the highest economical filter aid concentration, the lowest naphtha dilution and shortest filtering cycle, and under these conditions maintain a high filtering rate and an economical wax yield.

Although in the example a heavy residual stock is mentioned, it must be understood that this process adapts itself to the economical dewaxing of other types of oil. Thus it may be desirable to recover the oil from the wax cake of a light motor oil or an oil of similar viscosity. This is particularly true when very low cold tests are to be obtained on the finished oils, necessitating low filtering temperatures. When such is the case the viscosity of the solution is considerably increased and filtering and drying conditions resembling those characteristic of heavier oils at higher filtering temperatures occur.

Alternative methods of operation may be employed such as the use of a partial wash on the first filtration if the nature of the stock will permit.

We claim:

1. A process for dewaxing oils which consists in adding a filter aid to a chilled mixture of wax-bearing oil and solvent, subjecting the mixture to a first stage of filtration, separately removing a cold-test oil filtrate and the filter cake from this stage of filtration, mixing the cold filter cake with a cold solvent and, without further chilling, subjecting the cold mixture to a second stage of filtration, and separately removing from this stage, and out of the dewaxing process, a second cold-test oil filtrate and the wax cake which is formed.

2. A process for dewaxing oils which consists in adding a filter aid to a chilled mixture of wax-bearing oil and solvent, subjecting the mixture to a first stage of continuous vacuum filtration, separately removing a cold-test oil filtrate and the filter cake from this stage of filtration, mixing the cold filter cake with a cold solvent and, without further chilling, subjecting the cold mixture to a second stage of continuous vacuum filtration, and separately removing from this stage, and out of the dewaxing process, a second cold-test oil filtrate and the wax cake which is formed.

3. A process for dewaxing oils which consists in adding a filter aid to a chilled mixture of wax-bearing oil and solvent, subjecting the mixture to a first stage of continuous vacuum filtration, separately removing a cold-test oil filtrate and the filter cake from this stage of filtration, mixing the cold filter cake with a cold solvent and, without further chilling, subjecting the mixture to a second stage of filtration, and separately removing from this stage, and out of the dewaxing process, a second cold-test oil filtrate and the wax cake which is formed.

4. A process for dewaxing oils which consists in adding a filter aid to a chilled mixture of wax-bearing oil and solvent, subjecting the mixture to a first stage of filtration, removing a cold-test oil filtrate from this stage of filtration, washing the filter cake with a suitable amount of cold solvent and removing the cake, mixing the cold filter cake with a cold solvent and, without further chilling, subjecting the cold mixture to a second stage of filtration, and separately removing from this stage, and out of the dewaxing process, a second cold-test oil filtrate and the wax cake which is formed.

5. A process for dewaxing oils which consists in adding a filter aid to a chilled mixture of wax-bearing oil and solvent, subjecting the mixture to a first stage of filtration, separately removing a cold-test oil filtrate and the filter cake from this stage of filtration, mixing the cold filter cake with a cold solvent and, without further chilling, subjecting the cold mixture to a second stage of filtration, separately removing from this stage, and out of the dewaxing process, a second cold-test oil filtrate, washing the wax cake which is formed with a suitable amount of cold solvent and removing the cake.

6. A process for dewaxing oils which consists in adding a filter aid to a chilled mixture of wax-bearing oil and solvent, subjecting the mixture to a first stage of filtration, separately removing the filtrate and the filter cake, mixing the filter cake with a cold solvent, and, without further chilling, subjecting the cold mixture to a second stage of filtration and subsequently blending the filtrate from the second stage with the filtrate from the first stage.

E. WAYNE REMBERT.
BROWN VAN VOORHEES.